US007646885B2

(12) United States Patent
Denzer et al.

(10) Patent No.: US 7,646,885 B2
(45) Date of Patent: Jan. 12, 2010

(54) METHOD FOR MONITORING PREPAID POSTAGE INDICIA ON MAIL

(75) Inventors: Rudi Denzer, Bonn (DE); Carsten Vullriede, Hodenhagen (DE); Jörg Diefenbach, Bickenbach (DE)

(73) Assignee: Deutsche Post AG, Bonn (DE)

( * ) Notice: Subject to any disclaimer, the term of this patent is extended or adjusted under 35 U.S.C. 154(b) by 1018 days.

(21) Appl. No.: 10/467,693

(22) PCT Filed: Jan. 25, 2002

(86) PCT No.: PCT/DE02/00264

§ 371 (c)(1),
(2), (4) Date: Jan. 5, 2004

(87) PCT Pub. No.: WO02/065409

PCT Pub. Date: Aug. 22, 2002

(65) Prior Publication Data

US 2004/0105572 A1 Jun. 3, 2004

(30) Foreign Application Priority Data

Feb. 12, 2001 (DE) ................................ 101 06 632

(51) Int. Cl.
*G06K 9/00* (2006.01)

(52) U.S. Cl. ........................ 382/101; 382/100; 382/102

(58) Field of Classification Search .......... 382/100-102
See application file for complete search history.

(56) References Cited

U.S. PATENT DOCUMENTS

| | | | | |
|---|---|---|---|---|
| 3,488,511 | A | 1/1970 | Mori et al. | 250/226 |
| 4,451,521 | A * | 5/1984 | Kaule et al. | 428/199 |
| 4,451,530 | A | 5/1984 | Kaule et al. | 428/323 |
| 5,535,127 | A | 7/1996 | Uno et al. | 364/464.02 |
| 5,943,432 | A | 8/1999 | Gilmore et al. | 382/101 |
| 5,974,147 | A * | 10/1999 | Cordery et al. | 705/62 |
| 5,992,601 | A | 11/1999 | Mennie et al. | 194/207 |
| 6,108,643 | A * | 8/2000 | Sansone | 705/62 |

FOREIGN PATENT DOCUMENTS

DE 30 20 652 C2 12/1981

(Continued)

OTHER PUBLICATIONS

International Preliminary Examination Report in PCT/DE02/00264 dated Sep. 10, 2003.
Novelty Search Report in corresponding HU Application No. P 05 01026 dated Dec. 5, 2005.
Office Action in corresponding RU Application No. 2003124746 dated Jan. 25, 2002.
International Search Report in PCT/DE02/00264 dated Jun. 16, 2003.

*Primary Examiner*—Wesley Tucker
(74) *Attorney, Agent, or Firm*—Marshall, Gerstein & Borun LLP

(57) ABSTRACT

The inventive method is characterized in that the prepaid postage indicia are checked to see if they contain a predefined security feature. If they do not, at least one selected read area of the mail is checked to determine whether it contains a predefined graphic representation of a prepaid postage indicia.

7 Claims, 1 Drawing Sheet

FOREIGN PATENT DOCUMENTS

| | | | |
|---|---|---|---|
| DE | 101 05 273 | A1 | 8/2002 |
| EP | 294 497 | B1 | 12/1988 |
| EP | 862 143 | A2 | 9/1998 |
| HU | 216 359 | A | 6/1999 |
| JP | 59-131189 | | 7/1984 |
| JP | 11-53603 | | 2/1999 |
| RU | 2 054 338 | C1 | 2/1996 |
| RU | 2 158 443 | C1 | 2/1999 |
| WO | WO 91/11703 | | 8/1991 |
| WO | WO 94/06102 | | 3/1994 |
| WO | WO 02/061695 | A2 | 8/2002 |

* cited by examiner

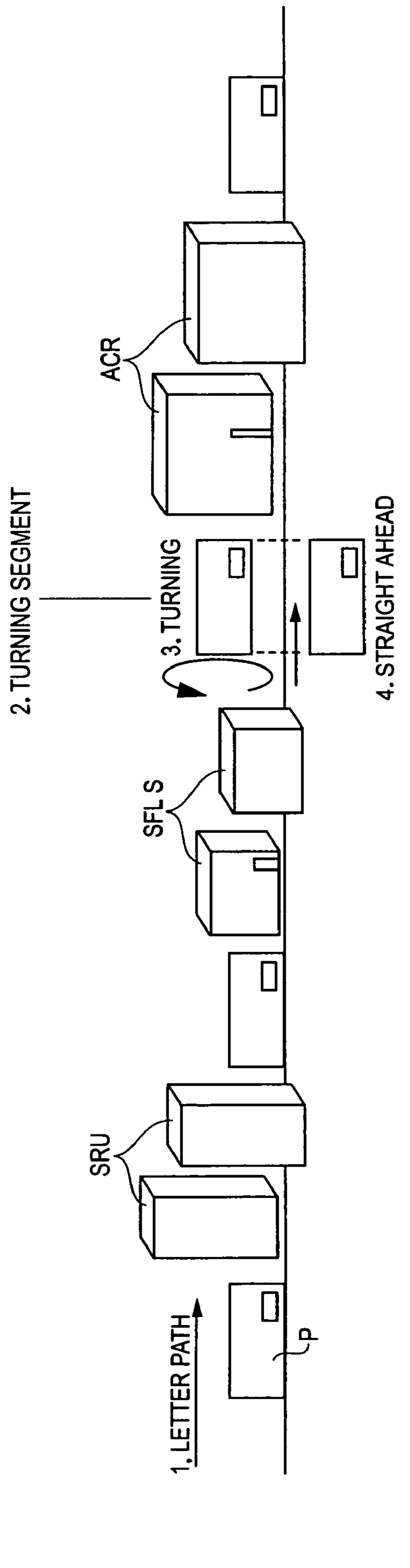
1. LETTER PATH
P
SRU
SFL S
2. TURNING SEGMENT
3. TURNING
4. STRAIGHT AHEAD
ACR

METHOD FOR MONITORING PREPAID POSTAGE INDICIA ON MAIL

This is the U.S. national phase of International Application No. PCT/DE02/100264 filed Jan. 25, 2002, the entire disclosure of which is incorporated herein by reference.

BACKGROUND OF THE INVENTION

1. Field of the Invention

The invention relates to a method for checking a postage indicium applied onto a mailpiece.

2. Related Technology

The invention is based on the objective of improving a method of the generic type in such a way that postage indicia applied onto mailpieces can be checked quickly and reliably. In particular, a method is to be provided that allows a large number of postage indicia applied onto mailpieces to be checked.

SUMMARY OF THE INVENTION

According to the invention, this objective is achieved in that a postage indicium is checked to see whether it contains a prescribed security feature and in that, in case the postage indicium does not contain said security feature, the postage indicium is checked to see whether at least one selected reading area of the mailpiece contains a graphic representation of a postage indicium.

It is advantageous to carry out the method in such a way that mailpieces containing a prescribed graphic representation in the selected reading area are marked as being genuine.

Another advantageous embodiment of the invention is characterized by the fact that, if the mailpiece displays a prescribed graphic representation of a postage stamp but does not contain the security feature, it is rejected.

In order to increase the security of the checking procedure, it is advantageous that the postage indicium is irradiated with light in order to check whether it contains a prescribed security feature.

In order to further enhance the security of the recognition of genuine postage indicia, it is advantageous to determine whether the irradiation with light has brought about fluorescence.

Moreover, it is advantageous to determine whether the fluorescence is superfluorescence.

Further advantages, special features and practical improvements of the invention will be apparent to those skilled in the art from the following disclosure of preferred embodiments of the invention with reference to the drawing.

BRIEF DESCRIPTION OF THE DRAWING

FIG. 1 is a schematic representation of the path traversed by a mailpiece bearing a postage indicium that is to be checked.

DETAILED DESCRIPTION

The schematic representation of the path in FIG. 1 shows that the device for checking a postage indicium applied onto a mailpiece comprises a conventional fluorescence sensor, a superfluorescence sensor and a symbol recognition unit ACR.

A first means for checking the presence of a postage indicium, especially a stamp, is referred to as SRU, whereby the abbreviation SRU indicates that, in the simplest case, this device is a Stamp Recognition Unit that checks the presence of a stamp and/or that ascertains the position of the stamp.

The checking device designated as SRU is, for example, a fluorescence sensor. Preferably, a light source is arranged in such a way that it systematically irradiates the surface of the mailpiece or a selected area of the surface of the mailpiece in such a way that areas applied onto the mailpiece and provided with a fluorescing agent are excited to fluoresce. This fluorescence is detected by the fluorescence sensor.

The fluorescence sensor is preferably coupled to a first means that enables the device to change the path of a letter.

The further checking procedure and/or the further path of the letter can be varied as a function of the result of the examination with the SRU means that serves to check the presence of a postage indicium.

Thus, for example, mailpieces that have no fluorescence can be rejected from the letter path.

Moreover, it is advantageous to check the presence of one or more security features. Fundamentally, the presence of a fluorescent dye can already be checked as a security feature.

In order to achieve greater protection against forgery, it is advantageous to use the presence of a fluorescent dye only as a means to determine the position of a postage indicium and, instead, to check the presence of other security features when the genuineness is to be checked.

In a letter path intended for the conveyance of regular letters, downstream from the checking device designated as SRU, there is a means for checking the presence of a security feature.

In the particularly advantageous case being presented here, a superfluorescence sensor serves as the means for checking the presence of the security feature.

The superfluorescence sensor shown utilizes a physical effect that had not yet been used so far for checking indicia in order to ascertain the genuineness of the postage indicia.

This effect is an anti-Stokes effect. The anti-Stokes effect comprises irradiating the postage indicia to be checked with low-energy electromagnetic radiation having a high intensity, exciting a fluorescence of higher-energy electromagnetic radiation and the subsequent detection of the higher-energy electric radiation.

This effect differs from the known examination using fluorescence since, with the known examination methods, an irradiation of the sample is carried out with higher-energy radiation (for example, UV light) while the subsequent emission involves low-energy radiation (for example, visible light).

In the especially preferred embodiment shown, the symbol recognition unit ACR controls a turning device. Preferably, the turning device positions a surface, preferably the surface area containing the first security feature, in an area in which it can be checked for the presence of the security feature.

Although a second security feature can comprise a wide array of features, such as, for example, watermarks, the use of a superfluorescence sensor is especially advantageous.

Preferably, the superfluorescence sensor is configured in such a way that it can analyze a spectral distribution of the electromagnetic radiation it has received.

Preferably, the superfluorescence sensor also determines especially the radiation intensity within a selected spectral range. In this manner, the superfluorescence sensor can be adapted to the emission behavior of the superfluorescent dye used for the production of the postage indicia.

Such an adaptation is especially advantageous, since, for energy-related reasons, the effect of the superfluorescence is generally weaker than conventional fluorescence.

In the direction of the letter path provided for regular mailpieces, there is a symbol recognition unit ACR downstream from the superfluorescence sensor.

Optionally, between the fluorescence sensor SFL S and the symbol recognition unit ACR, there are additional devices for checking and/or conveying mailpieces. The case shown is a turning segment for letters.

However, it is likewise possible to omit the turning segment or optionally to replace it by other conveying, sorting or positioning means. The individual means here are adapted to the mailpieces to be checked, especially taking into consideration the security stages to be attained and the type of mailpieces. Taking the type of mailpieces into consideration is especially advantageous since the method shown is suitable for checking the postage indicia of all kinds of letters as well as freight shipments.

The other means shown can also be replaced by means having equivalent functions, for example, the sensors shown can be replaced by cameras.

Preferably, the symbol recognition unit ACR has at least one sensor. In a particularly advantageous embodiment, the sensor is connected to a data processing unit, for example, via a data line. Graphic information transmitted from the sensor is forwarded via the data line.

The symbol recognition unit ACR is preferably configured in such a way that it recognizes graphic symbols and associates them with graphic characters. This is why it is referred to as an Advanced Color Recognizer.

The symbol recognition unit ACR is connected to a data processing unit, and the data processing unit allows and/or supports a comparison of the graphic information with the stored representations of postage indicia.

The symbol recognition unit can be connected to a computer. It is possible to equip the symbol recognition unit with its own computer. Particularly in large checking centers for postage indicia, for example, in mail centers, however, it is advantageous for several symbol recognition units to be connected to a central computer.

The term "computer" is not to be construed in any limiting manner. It can be any unit that is capable of performing computations, for example, a work station, a personal computer, a microcomputer or a circuit that is suitable for performing calculations and/or comparisons.

The use of a central computer for several symbol recognition units is especially advantageous since this allows the input of new postage indicia, for example, new postage stamps, in one single processing step for several devices.

However, by the same token, the symbol recognition units of several mail centers can be networked with a central computer that works for several mail centers. In this manner, a checking center can assume the checking tasks for several mail or freight centers. For example, a postal service provider can operate a central computer for several, preferably for all mail and/or freight centers.

The computer contains a database with a learning system for purposes of learning symbols. These symbols are preferably graphic representations of postage stamps or other postage indicia. Preferably, a freely selectable subset is generated as the current database from a full set of data contained in the database.

When the database is used, it is advantageous for information about the postage indicia and/or process instructions to be transmitted to the individual devices. Such process instructions are preferably automated processing schemes or program routines that preferably control one or more functions of the device for purposes of checking the postage indicia.

The symbol recognition unit preferably comprises one or more sensors that evaluate color information, especially local distributions of color information, and compare them to prescribed symbols.

Preferably, the symbol recognition unit serves to recognize prescribed postage indicia, especially postage stamps.

Although it is possible to connect a symbol recognition unit to a data processing unit, it is even more advantageous to connect several symbol recognition units ACR to one or more central data processing units. The central data processing unit preferably comprises a database with an expandable data memory containing information for recognizing symbols so that the recognition rate can be further improved by evaluating preceding executions of the checking procedure.

It is especially advantageous to use the device presented to carry out a checking procedure as follows:

Mailpieces MP are first carried along a prescribed letter path to the means SRU for checking the presence of a specific postage indicium, especially a postage stamp.

If the checking with the means designated as SRU for checking the presence of a postage indicium, especially a postage stamp, reveals that a postage indicium, especially a postage stamp, is present for which the presence of the security feature is to be expected, then a checking procedure is carried out to see whether said security feature is actually present.

In checking the actual presence of a security feature, it is especially advantageous to use a superfluorescence sensor, SFL S.

In the vicinity of the SFL S means used to check the presence of a security feature, it is checked whether superfluorescence is present. In order to check the presence of superfluorescence, it is checked here, too, whether higher-energy radiation is emitted.

For example, after a preceding irradiation with infrared light, it is checked whether visible light is emitted. As an alternative, for example, after irradiation with visible light, it is checked whether light in the UV range is emitted. Advantageously, here a spectral distribution of the light emitted from the area of the mailpiece is examined and/or it is checked whether this light contains spectral components having a predefined wavelength and intensity.

Since substances, especially dyes with components of rare earth atoms, that have one or more discrete fluorescence lines are used for the production of forgery-proof superfluorescent dye, it is possible in this manner to recognize whether a genuine superfluorescent dye is present.

The above-mentioned means for checking security features can be replaced by means that fulfill the same function.

Moreover, at suitable places in the device, it is advantageous to create possibilities to reject mailpieces on which one or more of the security features are not found and/or that do not contain a prescribed graphic symbol as a postage indicium.

The result of the checking for the presence of superfluorescence can have different consequences in different embodiments of the invention for the execution of the further checking procedure and/or the detection of postage indicia as genuine.

In order to achieve the greatest possible security, for example, the method can be carried out in such a way that only those postage indicia are recognized as genuine that have a superfluorescent dye as well as a stamp-like graphic representation of the postage indicium to be examined.

On the other hand, postage indicia that do not have superfluorescence such as, for example, postal markings or sender cancellations can nevertheless be recognized as genuine if the presence of an appropriate graphic symbol is checked.

The method described allows a great flexibility in its execution and in its adaptation to various security standards and/or throughput rates.

The invention claimed is:

1. A method for checking a postage indicium applied onto a mailpiece, comprising (a) checking the postage indicium to determine whether a prescribed security feature is expected and, if the security feature is expected, (b) checking the postage indicium to determine whether the postage indicium contains the prescribed security feature and, if the prescribed security feature is not expected, (c) checking the postage indicium with at least one of a plurality of symbol recognition units to determine whether at least one selected reading area of the mailpiece contains a prescribed graphic representation of a postage indicium, (d) comparing the graphic representation with representations of postage indicia stored in a data processing unit connected with at least one of the symbol recognition units, (e) marking mailpieces including the prescribed security feature or including the prescribed graphic representation as being genuine, (f) irradiating the postage indicium with light in order to check whether the postage indicium contains the prescribed security feature and where the prescribed security feature is placed, (g) checking whether the irradiation with light has caused fluorescence, and (h) checking whether the fluorescence is super fluorescence.

2. The method according to claim 1, comprising recognizing the mailpiece as having been forged if the mailpiece displays a prescribed graphic representation of a postage stamp and does not contain the prescribed security feature.

3. The method according to claim 1, comprising rejecting the mailpiece if at least one security feature is not present.

4. The method of claim 1, wherein a super fluorescence sensor analyzes a spectral distribution of electromagnetic radiation emitted from the mailpiece during the checking whether the fluorescence is super fluorescence.

5. The method of claim 4, wherein the super fluorescence sensor determines radiation intensity of the electromagnetic radiation within a selected spectral range.

6. The method of claim 1, wherein checking whether the fluorescence is super fluorescence comprises irradiating the mailpiece with infrared light and checking whether visible light is emitted from the mailpiece.

7. The method of claim 6, further comprising checking a spectral distribution of the visible light emitted from the mailpiece for predefined wavelengths and intensifies.

* * * * *